United States Patent
Hartlove

[19]

[11] Patent Number: 6,099,805
[45] Date of Patent: Aug. 8, 2000

[54] SINGLET-DELTA OXYGEN GENERATOR

[75] Inventor: Jeffrey S. Hartlove, San Pedro, Calif.

[73] Assignee: TRW Inc., Redondo Beach, Calif.

[21] Appl. No.: 08/890,715

[22] Filed: Jul. 9, 1997

[51] Int. Cl.$^7$ ....................................................... A62B 7/08

[52] U.S. Cl. .......................... 422/122; 239/433; 239/434; 261/DIG. 48; 422/120; 422/305

[58] Field of Search ..................................... 422/120, 122, 422/305; 239/102.2, 398, 426, 433, 434; 261/DIG. 48

[56] References Cited

U.S. PATENT DOCUMENTS

| | | | |
|---|---|---|---|
| 4,717,549 | 1/1988 | Malafosse et al. | 422/122 |
| 4,792,435 | 12/1988 | Nakajima | 422/110 |
| 4,871,489 | 10/1989 | Ketchum | 264/9 |
| 5,229,100 | 7/1993 | Harpole | 423/579 |
| 5,392,988 | 2/1995 | Thayer, III | 239/102.2 |

*Primary Examiner*—Krisanne Thornton
*Attorney, Agent, or Firm*—Michael S. Yatsko

[57] ABSTRACT

A singlet-delta oxygen generator suitable for use in a COIL-type chemical laser system is provided wherein the generator has a gaseous reactant distributor which includes (a) side, top and bottom walls to form a distribution chamber; (b) a thin distribution plate disposed vertically within one of the side walls adjacent to the falling droplet zone, the distribution plate having a plurality of holes to allow the passage of gaseous first reactant therethrough; (c) a plurality of gaseous first reactant inlet openings for allowing the influx of gaseous first reactant into the distribution chamber; and (d) a liquid drain disposed in the bottom wall. In a preferred embodiment of the invention, the gaseous reactant inlet openings are conduits which direct the influx of gaseous first reactant away from the distribution plate. The invention allows that (i) gaseous first reactant can be flowed into the distribution chamber via the gaseous reactant inlet openings in a manner such that the distribution of gaseous reactant within the distribution chamber is substantially uniform, (ii) the gaseous first reactant can be allowed to flow laterally through the holes in the distribution plate and into droplets of the liquid second reactant falling downwardly within the falling droplet zone, and (iii) any liquid entering the distribution chamber can be promptly drained away via the liquid drain.

19 Claims, 4 Drawing Sheets

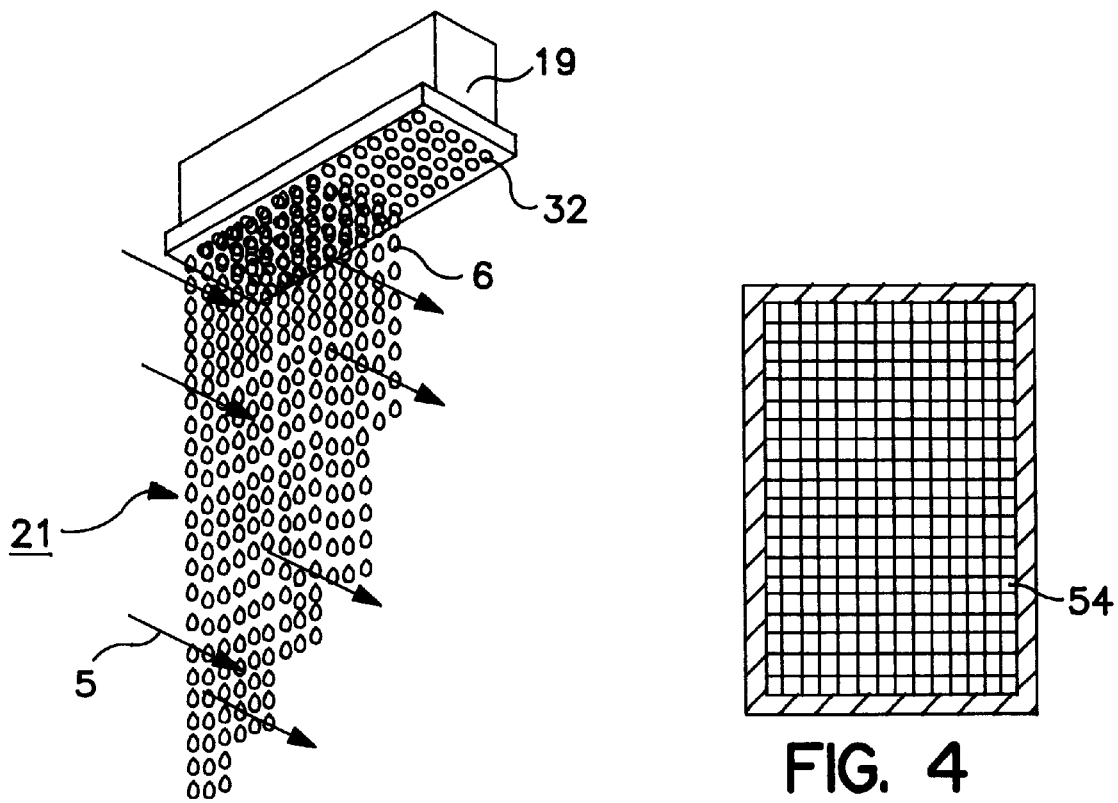
FIG. 2
FIG. 4
PRIOR ART
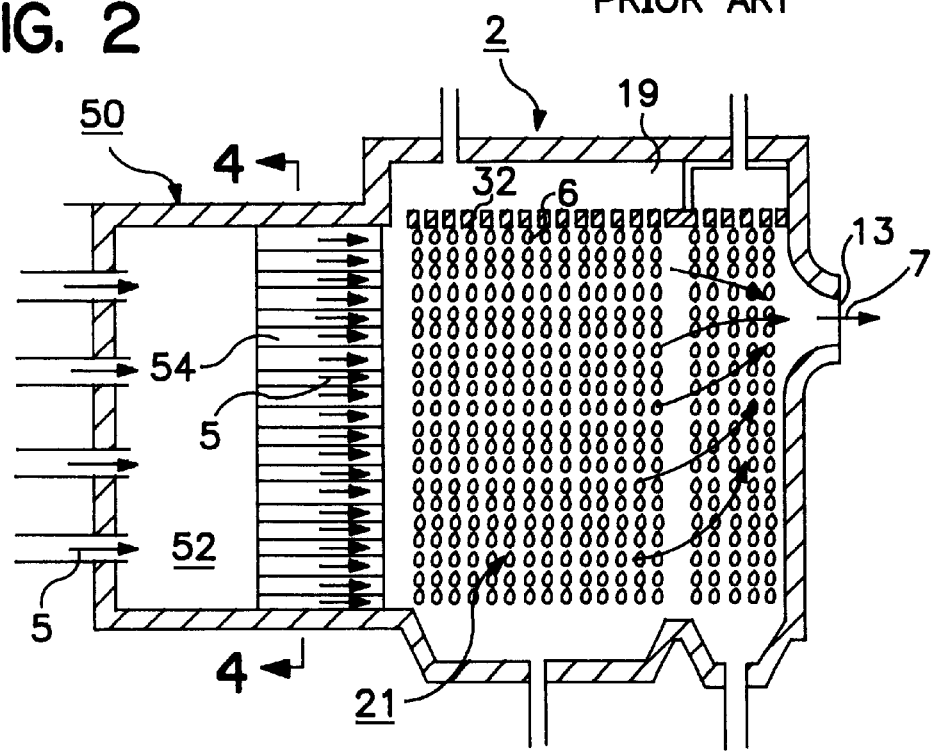
FIG. 3
PRIOR ART

SINGLET-DELTA OXYGEN GENERATOR

FIELD OF THE INVENTION

This invention relates generally to chemical lasers and, more particularly, to singlet-delta oxygen generators used in chemical oxygen iodine lasers.

BACKGROUND

Chemical laser systems are known to have the capability of generating high energy laser beams. One particular chemical laser system is a system which employs the chemical interaction of singlet-delta oxygen and iodine. Such a chemical oxygen iodine laser is commonly known as a "COIL". COILs are particularly suitable for weapon systems, such as anti-theater ballistic missile system, because of their range and their ability to control a high intensity beam to a target, such as a theater ballistic missile. The basic chemistry of a COIL system is well-known in the art.

To produce singlet-delta oxygen, COILS typically employ a singlet-delta oxygen generator wherein chlorine gas is reacted with basic hydrogen peroxide to produce singlet-delta oxygen. In one such singlet-delta oxygen generator, basic hydrogen peroxide is formed into uniform tiny droplets which are allowed to gravitate downward in a falling droplet zone. Chlorine gas is introduced laterally into the falling droplet zone wherein the chlorine reacts with the basic hydrogen peroxide to form singlet-delta oxygen molecules.

One problem with such singlet-delta oxygen generators arises from the non-uniform distribution of chlorine into the falling droplet zone. When the distribution of chlorine into the falling droplet zone is non-uniform, the efficiency of the overall production of singlet-delta oxygen is markedly reduced. Maintaining the uniformity of chlorine gas flow into the falling droplet zone has been found to be very important in maintaining a high rate of singlet-delta oxygen production.

Another problem with such singlet-delta oxygen generators of the type described above arises when some of the falling basic hydrogen peroxide droplets splash back into the chlorine distribution equipment. This results in a slow, but steady build-up of liquid materials in the chlorine distribution equipment which also adversely affects the efficiency of the generator.

Accordingly, there is a need for a singlet-delta oxygen generator which simply and inexpensively overcomes these problems.

SUMMARY

The invention satisfies this need. The invention is a singlet-delta oxygen generator of the type wherein a gaseous first reactant, such as chlorine, is reacted with falling droplets of a liquid second reactant, such as basic hydrogen peroxide, in a falling droplet zone. The invention comprises the use in such a generator of a gaseous reactant distributor comprising (a) side, top and bottom walls to form a distribution chamber; (b) a thin distribution plate disposed vertically within one of the side walls adjacent to the falling droplet zone, the distribution plate having a plurality of holes to allow the passage of gaseous first reactant therethrough; (c) a plurality of gaseous first reactant inlet openings for allowing the influx of gaseous first reactant into the distribution chamber; and (d) a liquid drain disposed in the bottom wall.

Using the a gaseous reactant distributor of the invention allows gaseous first reactant to be flowed into the distribution chamber via the gaseous reactant inlet openings in a manner such that the distribution of gaseous reactant within the distribution chamber is substantially uniform. The gaseous first reactant can then be allowed to flow laterally through the holes in the distribution plate and into droplets of the liquid second reactant falling downwardly within the falling droplet zone. Any liquid entering the distribution chamber can be promptly drained away via the liquid drain.

In a preferred embodiment of the invention, the gaseous first reactant inlet openings comprise a plurality of conduits which direct the flow of gaseous first reactant entering the distribution chamber to impinge upon a wall of the distribution chamber disposed opposite the distribution plate.

In another preferred embodiment of the invention, each hole in the distribution plate has an impingement plate disposed immediately downstream of and opposite such hole. Each such impingement plate is typically between about 50 and 80% of the area of the hole. Preferably, each impingement plate is disposed at a distance between about 1.1 and about 1.5 cm in front of the hole.

DRAWINGS

These features, aspects and advantages of the present invention will become better understood with regard to the following description, appended claims and accompanying figures where:

FIG. 2 is a detailed perspective view of a falling droplet zone within a singlet-delta oxygen generator;

FIG. 3 is a detailed cross-sectional side view of a first reactant distribution system used in singlet-delta oxygen generators of the prior art;

FIG. 4 is a cross-sectional view of the first reactant distribution system of the prior art shown in FIG. 3, taken along line 4—4;

DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figure 1:
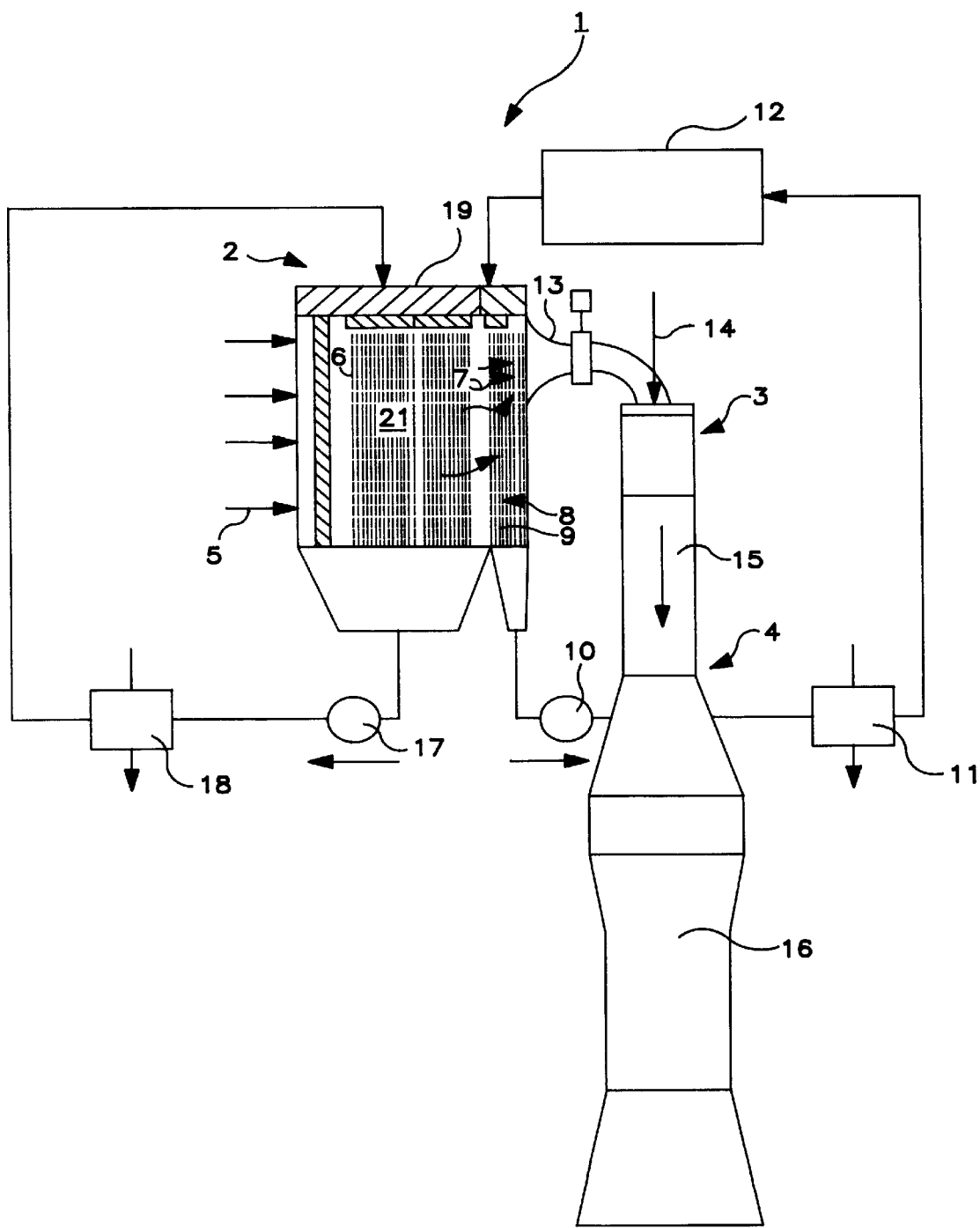
FIG. 1 is a diagrammatic view of a chemical oxygen laser useable with the invention.

FIG. 1 illustrates a chemical oxygen-iodine laser ("COIL") 1 useable in the invention. The COIL 1 includes a singlet-delta oxygen generator 2, a photon generator 3 and a pressure recovery system 4.

In the singlet-delta oxygen generator 2, singlet-delta oxygen is produced from the reaction of a gaseous first reactant 5, typically a halogen gas such as chlorine, and a second reactant 6 typically basic hydrogen peroxide. Typically, the gaseous first reactant 5 is introduced into the singlet-delta oxygen generator 2 in a mixture with an inert gas, such as helium.

Singlet-delta oxygen 7 produced in the singlet-delta oxygen generator 2 flows through a water trap 8, preferably comprising a falling droplet field 9 of chilled basic hydrogen peroxide continuously recycled with a pump 10 and through a chiller 11 and a droplet generator 12.

The singlet-delta oxygen 7 then flows out of the singlet-delta oxygen generator 2 via an outlet 13 in the singlet-delta oxygen generator 2 to the photon generator 3 where it is reacted with iodine 14 to produce a high energy laser beam (not shown).

Reactant products exiting the photon generator 3 are drawn through the pressure recovery system 4, comprising a diffuser 15 and an ejector 16, and exhausted to the atmosphere.

The invention is a singlet-delta oxygen generator 2 of the type shown in FIG. 1 wherein a gaseous first reactant 5 is reacted with a liquid second reactant 6 which is continuously recycled from a falling droplet zone 21 with a pump 17 through a chiller 18 and a droplet generator 19. In the invention, the singlet-delta oxygen generator 2 comprises a gaseous reactant distributor 20 having the unique features shown in FIGS. 5–8.

The gaseous reactant distributor 20 has side, top and bottom walls 22, 24 and 26, respectively, to form a distribution chamber 28. A thin distribution plate 30, such as one having a thickness less than about one half centimeter, is disposed vertically within one of the side walls 22 adjacent to the falling droplet zone 21 of the singlet-delta oxygen generator 2.

The liquid second reactant 6 is introduced into the falling droplet zone 21 at inlets 32 in the bottom of the droplet generator 19. The introduction of the second reactant 6 is done in a way which produces droplets of second reactant 6, preferably droplets of highly uniform dimensions. In one embodiment described in U.S. Pat. No. 5,392,988, the entirety of which is incorporated herein by this reference, more than about 95% of the droplets have a nominal diameter between about 300 and about 400 microns.

The gaseous first reactant 5 is introduced through the distribution plate 30 into the falling droplet zone 21 in a lateral direction transverse to the droplets falling within the falling droplet zone 21.

The distribution plate 30 has a plurality of holes 34 to allow the passage of the first reactant 5 therethrough. The holes 34 are sized and dimensioned to allow for the uniform flow of the gaseous first reactant 5 into the falling droplet zone 21. In a typical embodiment, the holes 34 in the distribution plate are round, having a diameter of between about 0.5 and about 0.8 cm. The number of holes 34 in the distribution plate 30 is chosen to provide uniform flow of gaseous first reactant 5 into the falling droplet zone 21. In a typical embodiment, the number of holes 34 within the distribution plate 30 is between about 0.4 and about 0.8 holes per sq. cm of distribution plate 30.

In one embodiment, the distribution plate 30 is approximately 10 cm by about 50 cm and is designed to provide a distribution of gaseous first reactant 5 through the holes 34 in the distribution plate 30 with a pressure differential of between about 1 and about 2 psi.

In a preferred embodiment of the invention, small impingement plates 36 are placed in front of each hole 34 in the distribution plate 30. Typically, each impingement plate 36 provides an area immediately opposite its corresponding hole 34 of between about 50 and about 80% of the area of the hole 34. Where the hole 34 is round and the impingement plate 36 is rectangular, the width of the impingement plate 36 can be about one half the diameter of the hole 34.

The impingement plates 36 are disposed in front of each hole 34 (downstream of the distribution plate 30) at a distance between about 1.1 and about 1.4 cm away from the distribution plate 30).

The impingement plates 36 provide for additional distribution uniformity of the gaseous first reactant 5 as it enters the falling droplet zone 21. The impingement plates 36 also tend to minimize the amount of liquid second reactant 6 from flashing back through the holes 34 in the distribution plate 30 and into the distribution chamber 28.

Figure 5:
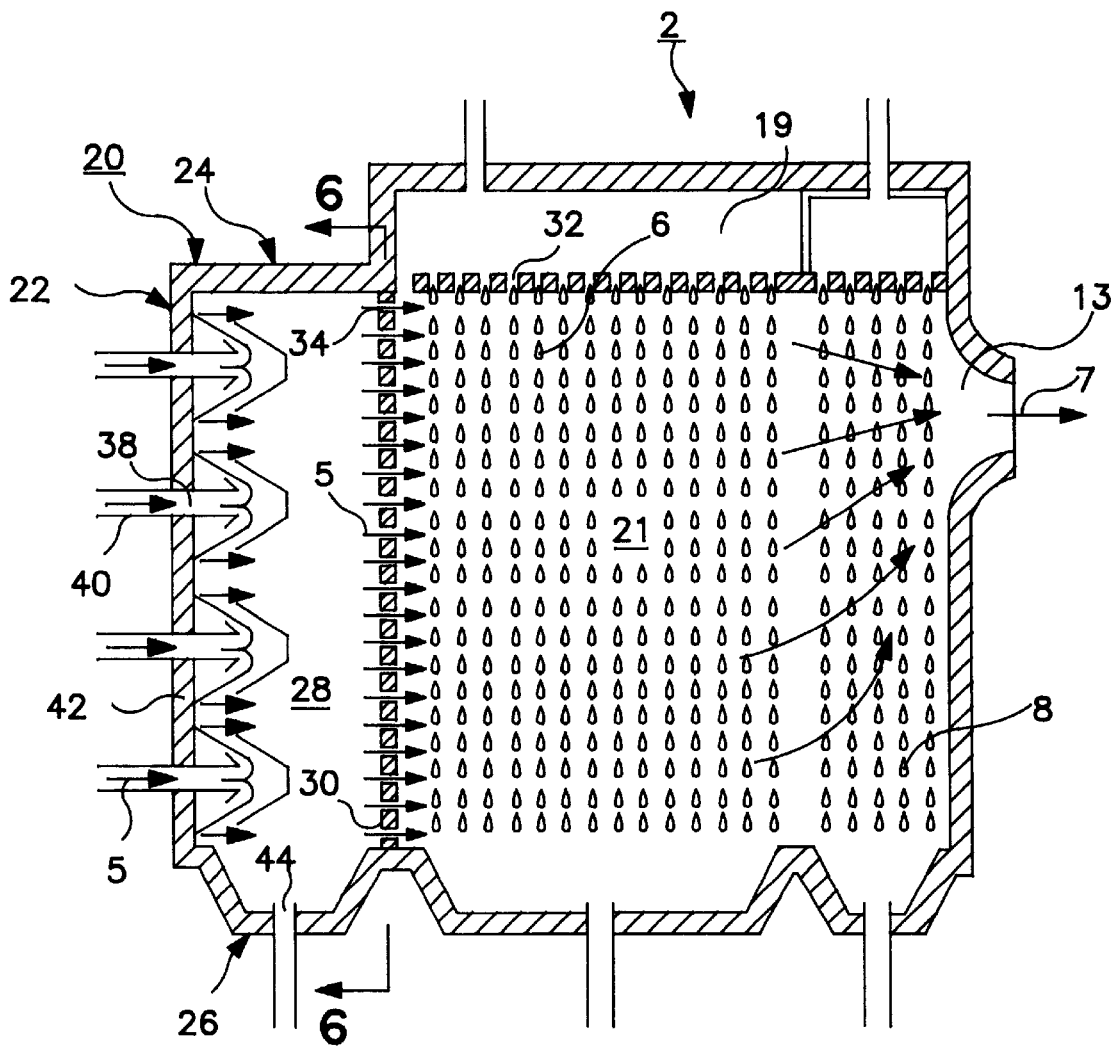
FIG. 5 is a cross-sectional side view of a singlet-delta oxygen generator having features of the invention.
Figure 6:
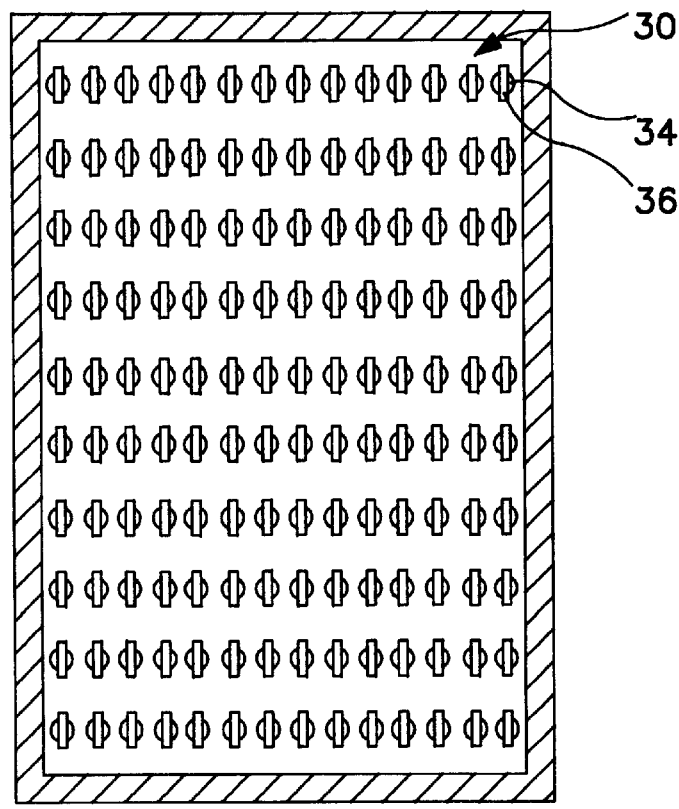
FIG. 6 is a front view of a first reactant distribution plate useful in the embodiment shown in FIG. 5, taken along line 6—6.
Figure 7:
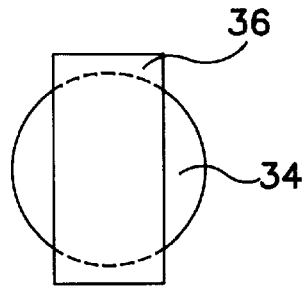
FIG. 7 is a detailed view of a hole within the distribution plate of FIG. 6.
Figure 8:
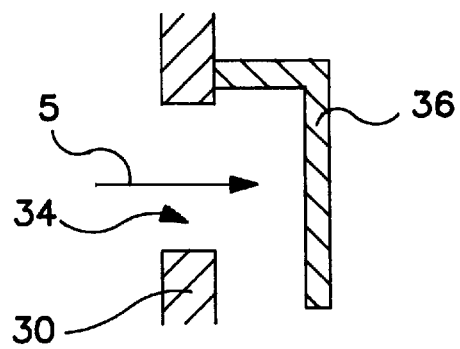
FIG. 8 is a cross-sectional side view of the hole shown in FIG. 7.

A plurality of gaseous reactant inlet openings 38 are provided in the gaseous reactant distributor 20 to allow the influx to gaseous first reactant 5 into the distributor chamber 28. The number and configuration of the gaseous reactant inlet openings 38 are chosen to provide for a relatively uniform distribution of gaseous first reactant 5 within the distribution chamber 28. Preferably, the gaseous reactant inlet openings 38 are conduits 40, such as shown in FIG. 5, which direct the incoming flow of gaseous first reactant 5 away from the distribution plate 30. In a still more preferred embodiment of the invention, the conduits 40 direct the flow of gaseous first reactant 5 to impinge upon a wall 42 opposite the distribution plate 30. In a typical example of such an embodiment, the wall 42 opposite the distribution plate 30 is disposed between about 1 and about 3 cm away from the distribution plate 30. The use of such gaseous reactant inlet conduits 40 provides for the further uniform flow of gaseous first reactant 5 through the distribution plate 30. Where the gaseous reactant inlet openings 38 are disposed so as to face a distribution plate 30, gaseous first reactant 5 has a tendency to flow directly to and through the holes 34 in the distribution plate 30, rather than first uniformly filling the distribution chamber 28.

A liquid drain 44 is disposed in the bottom wall 26 of the distribution chamber 28. The liquid drain 44 is typically an opening connected in fluid tight communication with a suitable liquid repository (not shown) for recycle to the falling droplet zone 21.

The invention allows for the gaseous first reactant 5 to be flowed into the distribution chamber 28 via the gaseous reactant inlet openings 38 in a manner such as the distribution of gaseous first reactant 5 within the distribution chamber 28 is substantially uniform. The gaseous first reactant 5 can then be allowed to flow unilaterally through the holes 34 in the distribution plate 30 and into droplets of the liquid second reactant 6 falling downwardly within the falling droplet zone 21. Any liquid entering the distribution chamber 28, such as by splashing backwards through the holes 34 in the distribution plate 30, can be promptly drained away via the liquid drain 44.

The gaseous reactant distributor 20 can be constructed of any suitable material compatible with weight, temperature, pressure and corrosion restraints. In many applications of the invention, most of the gaseous reactant distributor 20 components can be constructed of a suitable plastic, such as polyvinyl chloride.

The gaseous reactant generator 20 of the invention, as illustrated in FIGS. 5–8, is contrasted with a typical gaseous reactant generator 50 of the prior art, as illustrated in FIGS. 3 and 4. In such a gaseous reactant generator 50 of the prior art, the distribution of gaseous first reactant 5 is accomplished by flowing gaseous first reactant 5 from a distribution chamber 52 through a series of short tubes 54. The problem with this configuration arises when some of the droplets in the falling droplet zone 21 splash into the tubes 54, thereby causing a slow build-up of liquid within the tubes 54. If the amount of splash is excessive, liquid can actually flow backwards in the tube 54 and into the distribution chamber 52. In all cases, any liquid splashing backward into the tubes 54 and/or into the distribution chamber 52 has no place to go but to be eventually expelled outwardly through the tubes 54 into the falling droplet zone 21. This periodic spewing of liquid through the tubes 54 into the falling droplet zone 21 has been found to greatly decrease the efficiency of the production of singlet-delta oxygen gaseous first reactant and the second reactant within the falling droplet zone 21.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. In a singlet delta oxygen generator for reacting a gaseous first reactant with falling droplets of a liquid second reactant in a falling droplet zone, the improvement comprising the use in the generator of a gaseous reactant distributor comprising:
    (a) side, top and bottom walls to form a distribution chamber;
    (b) a distribution plate disposed vertically within one of the side walls adjacent to the falling droplet zone, the distribution plate having a plurality of holes to allow the passage of gaseous first reactant therethrough;
    (c) a plurality of gaseous first reactant inlet openings for allowing the influx of the gaseous first reactant into the distribution chamber such that the distribution of the gaseous first reactant is substantially uniform; and
    (d) a liquid drain disposed in the bottom wall;
wherein (i) the gaseous first reactant can be allowed to flow laterally through the holes in the distribution plate and into droplets of the liquid second reactant falling downwardly within the falling droplet zone, and ii wherein liquid entering the distribution chamber can be promptly drained away via the liquid drain.

2. The singlet oxygen generator of claim 1 wherein the holes in the distribution plate are substantially round and have a diameter between about 0.5 and about 0.8 cm.

3. The singlet oxygen generator of claim 1 wherein the distribution plate contains between about 0.4 and about 0.8 holes/cm$^2$.

4. The singlet oxygen generator of claim 1 wherein the area of the distribution plate is between about 300 and about 700 cm$^2$.

5. The singlet oxygen generator of claim 1 wherein an impingement plate is disposed immediately downstream of each hole in the distribution plate.

6. The singlet oxygen generator of claim 5 wherein the area of each impingement plate disposed immediately opposite each hole is between about 50 and about 80% of the area of the hole.

7. The singlet oxygen generator of claim 6 wherein the distance between each impingement plate and the distribution plate is between about 1.1 and about 1.4 cm.

8. The singlet oxygen generator of claim 1 wherein the gaseous first reactant inlet openings are conduits which direct the flow of gaseous first reactant entering the distribution chamber away from the distribution plate.

9. The singlet oxygen generator of claim 8 wherein the conduits direct the flow of gaseous first reactant entering the distribution chamber to impinge upon a wall of the distribution chamber disposed opposite the distribution plate.

10. The singlet oxygen generator of claim 9 wherein the side wall disposed opposite the distribution plate is substantially parallel to the distribution plate and is disposed between about 1 and about 3 cm away from the distribution plate.

11. In a singlet delta oxygen generator wherein a gaseous chlorine-containing first reactant is reacted with falling droplets of a liquid basic hydrogen peroxide-containing second reactant in a falling droplet zone, the improvement comprising the use in the generator of a gaseous reactant distributor comprising:
    (a) side, top and bottom walls to form a distribution chamber;
    (b) a distribution plate disposed vertically within one of the side walls adjacent to the failing droplet zone, the distribution plate having a plurality of holes to allow the passage of gaseous first reactant therethrough;
    (c) an impingement plate disposed immediately downstream of each hole in the distribution plate;
    (d) a plurality of gaseous first reactant inlet conduits for allowing the influx of the gaseous first reactant into the distribution chamber, the conduits directing the flow of the gaseous first reactant entering the distribution chamber away from the distribution plate; and
    (e) a liquid drain disposed in the bottom wall;
wherein (i) gaseous first reactant can flow into the distribution chamber via the gaseous reactant inlet conduits in a manner such that the distribution of gaseous reactant within the distribution chamber is substantially uniform, (ii) the gaseous first reactant can then be allowed to flow laterally through the holes in the distribution plate and into droplets of the liquid second reactant falling downwardly within the falling droplet zone, and (iii) liquid entering the distribution chamber can be promptly drained away via the liquid drain.

12. The singlet oxygen generator of claim 11 wherein the area of each impingement plate disposed immediately opposite each hole is between about 50 and about 80% of the area of the hole.

13. The singlet oxygen generator of claim 11 wherein the distance between each impingement plate and the distribution plate is between about 1.1 and about 1.4 cm.

14. The singlet oxygen generator of claim 11 wherein the conduits direct the flow of gaseous first reactant entering the distribution chamber to impinge upon a wall of the generator disposed opposite the distribution plate.

15. In a singlet delta oxygen generator wherein a gaseous chlorine-containing first reactant is reacted with falling droplets of a liquid basic hydrogen peroxide-containing second reactant in a falling droplet zone, the improvement comprising the use in the generator of a gaseous reactant distributor comprising:
    (a) side, top and bottom walls to form a distribution chamber;
    (b) a distribution plate disposed vertically within one of the side walls adjacent to the falling droplet zone, the distribution plate having a plurality of holes to allow the passage of gaseous first reactant therethrough;
    (c) an impingement plate disposed immediately downstream of each hole in the distribution plate, the area of each impingement plate disposed immediately opposite each hole is between about 50 and about 80% of the area of the hole and the distance between each impingement plate and the distribution plate is between about 1.1 and about 1.4 cm;
    (d) a plurality of gaseous first reactant inlet conduits for allowing the influx of gaseous first reactant into the distribution chamber, the conduits directing the flow of gaseous first reactant entering the distribution chamber to impinge upon a side wall of the generator disposed opposite the distribution plate; and (e) a liquid drain disposed in the bottom wall;

wherein (i) gaseous first reactant can be flowed into the distribution chamber via the gaseous reactant inlet conduits in a manner such that the distribution of gaseous reactant within the distribution chamber is substantially uniform, (ii) the gaseous first reactant can then be allowed to flow laterally through the holes in the distribution plate and into droplets of the liquid second reactant falling downwardly within the falling droplet zone, and (iii) liquid entering the distribution chamber is promptly drained away via the liquid drain.

16. The singlet oxygen generator of claim 15 wherein the holes in the distribution plate are substantially round and have a diameter between about 0.5 and about 0.8 cm.

17. The singlet oxygen generator of claim 15 wherein the distribution plate contains between about 0.4 and about 0.8 holes/cm$^2$.

18. The singlet oxygen generator of claim 15 wherein the area of the distribution plate is between about 300 and about 700 cm$^2$.

19. The singlet oxygen generator of claim 15 the distance between the oppositely-disposed side wall and the distribution plate is between about 1 and about 3 cm.

* * * * *